United States Patent [19]

Isaka et al.

[11] Patent Number: 4,717,516

[45] Date of Patent: Jan. 5, 1988

[54] PRODUCTION OF POLYESTER SHAPED PRODUCT

[75] Inventors: Tsutomu Isaka; Hiroshi Nagano, both of Aichi, Japan

[73] Assignee: Toyo Boseki Kabushiki Kaisha, Japan

[21] Appl. No.: 824,305

[22] Filed: Jan. 30, 1986

Related U.S. Application Data

[63] Continuation of Ser. No. 600,056, Apr. 13, 1984, abandoned.

[30] Foreign Application Priority Data

Apr. 13, 1983 [JP] Japan ................................. 58-65878
Apr. 13, 1983 [JP] Japan ................................. 58-65879
Apr. 13, 1983 [JP] Japan ................................. 58-65880

[51] Int. Cl.$^4$ ............................................. B32B 31/28
[52] U.S. Cl. .................................. 264/22; 156/244.17; 156/272.6; 156/285; 264/85; 427/40
[58] Field of Search .......................... 427/39–41; 156/272.6, 285, 244.17, 244.23, 244.24, 244.27; 425/174, 174.4; 264/22, 209.6, 85; 250/492.1

[56] References Cited

U.S. PATENT DOCUMENTS

| | | | |
|---|---|---|---|
| 3,407,130 | 10/1968 | Hailstone | 250/492.1 |
| 3,407,131 | 10/1968 | Hailstone | 250/492.1 |
| 3,754,117 | 8/1973 | Walter | 219/383 |
| 3,790,801 | 2/1974 | Coleman | 250/492.1 |
| 3,807,052 | 4/1974 | Trove | 250/492.1 |
| 4,118,873 | 10/1978 | Rothchild | 250/492.1 |
| 4,135,098 | 1/1979 | Trove | 250/492.1 |
| 4,395,434 | 7/1983 | Imada et al. | 427/38 |
| 4,396,641 | 8/1983 | Imada et al. | 427/41 |

Primary Examiner—Donald E. Czaja
Assistant Examiner—Merrell C. Cashion, Jr.
Attorney, Agent, or Firm—Jones, Tullar & Cooper

[57] ABSTRACT

A process for enhancing the adhesion of the surface of a shaped product made of a polyester composition which comprises applying corona discharge to the surface under the continuous movement between an electrode for discharge and another electrode opposite thereto while jetting a gaseous material containing oxygen in an amount of not more than 20% by volume onto the part of said surface to which corona discharge is applied so as to achieve the following relationships among oxygen indexes and nitrogen indexes before and after the application of corona discharge:

$$-3.5 \leq (Oi' - Oi)/(Ni' - Ni) \leq 1.5 \quad (1)$$

$$3 \leq Ni' \quad (2)$$

wherein Oi and Oi' are respectively the oxygen indexes before and after the application of corona discharge and Ni and Ni' are respectively the nitrogen indexes before and after the application of corona discharge.

14 Claims, 5 Drawing Figures

PRODUCTION OF POLYESTER SHAPED PRODUCT

This is a continuation of co-pending application Ser. No. 600,056 filed on Apr. 13, 1984, now abandoned.

The present invention relates to the production of a polyester shaped product. More particularly, it relates to the production of a polyester shaped product improved in adhesion at the surface by treatment of corona discharge.

Treatment of shaped products made of plastic materials with corona discharge for improvement of their surface characteristics such as adhesive properties is well known. Since, however, the improving effect is not sufficient, there have been made various proposals. For instance, Japanese patent publication (examined) No. 17747/73 proposes the supply of an organic solvent to the discharge part of a plastic shaped product so as to promote a chemical change at such part. But, this proposal is hardly applicable to such a case where the remaining solvent at the surface causes any trouble as requiring vacuum metallizing or dry packaging as a subsequent step. Further, for instance, Journal of Applied Polymer Science, Vol. 15, p. 1365-1375 (1971) proposes to carry out corona discharge in an inert gas atmosphere so as to prevent unfavorable influences due to oxygen. However, this proposal requires a great quantity of inert gas. In addition, when corona discharge is applied to a running shaped product as seen in the industrial production, oxygen is more or less carried with the running shaped product to the atmosphere wherein corona discharge is effected so that the influence of oxygen can not be satisfactorily avoided. While this influence may be more or less suppressed by dropping the running speed, such dropping results in damage at the surface of the shaped product so that various problems such as bad appearance, poor adhesion and increase in blocking are caused. In addition, a reduction in productivity will be naturally produced.

As a result of an extensive study, it has now been found that on the corona discharge treatment of a shaped product made of a certain polyester composition, jetting of a gaseous material containing oxygen in an amount of not more than 20% by volume onto the surface of the shaped product to be subjected to corona discharge so as to make certain relationships between an oxygen index and a nitrogen index is quite effective in improving the adhesive properties of surface. The present invention is based on the above finding.

According to the present invention, there is provided a process for enhancing the adhesion of the surface of a shaped product made of a polyester composition which comprises applying corona discharge to said surface under the continuous movement between an electrode for discharge and another electrode opposite thereto while jetting a gaseous material containing oxygen in an amount of not more than 20% by volume onto the part of said surface to which corona discharge is applied so as to achieve the following relationships among oxygen indexes and nitrogen indexes in the specimen within 100 Å from said surface before and after the application of corona discharge:

$$-3.5 \leq (Oi'-Oi)/(Ni'-Ni) \leq 1.5 \quad (1)$$

$$3 \leq Ni' \quad (2)$$

wherein $Oi$ and $Oi'$ are respectively the oxygen indexes before and after the application of corona discharge and $Ni$ and $Ni'$ are respectively the nitrogen indexes before and after the application of corona discharge, said polyester composition comprising at least one polyester comprising units of at least one dibasic acid, of which not less than 80 mol % is terephthalic acid, and units of at least one diol as the component (A) and optionally at least one block copolymerized polyester comprising units of a high melting point crystalline polyester segment, the polymer constituted with the high melting point crystalline polyester segment alone having a melting point of not lower than 170° C., and units of a low melting point soft polyester segment having a molecular weight of 400 to 10,000, the polymer constituted with the low melting point soft polyester segment alone having a softening or melting point of not higher than 100° C., as the component (B) and/or at least one polyester comprising units of at least one dibasic acid, of which 25 to 85 mol % is terephthalic acid, and units of at least one diol as the component (C) in a weight proportion satisfying the following relationships:

$$(B+C)/(A+B+C) \times 100 \leq 60 \quad (3)$$

$$0 \leq B/(B+C) \leq 100 \quad (4)$$

wherein A, B and C are respectively the weights of the components (A), (B) and (C).

Throughout the specification, the terms "oxygen index" and "nitrogen index" are intended to mean respectively the number of oxygen atoms per 100 carbon atoms and the number of nitrogen atoms per 100 carbon atoms in the specimen within 100 Å from its surface as determined by the following procedure:

Using an ESCA spectrometer (Medel ES-200; manufactured by Kokusai Denki K.K.), the integrated intensity from the 1s orbit spectrum of carbon atom at the surface of a specimen to be tested and the integrated intensity from the peak corresponding to the bonding energy of an organic nitrogen atom in the 1s orbit spectrum of oxygen atom at said surface were determined, and the ratio of the former integrated intensity to the latter integrated intensity was calculated. On the basis of the thus calculated ratio, the number of oxygen atoms per 100 carbon atoms (i.e. the oxygen index) was determined. The oxygen indexes of the specimen before and after the application of corona are respectively represented as "$Oi$" and "$Oi'$". Likewise, the number of the nitrogen atoms per 100 carbon atoms (i.e. the nitrogen index) was determined. The nitrogen indexes of the specimen before and after the application of corona discharge are respectively represented as "$Ni$" and "$Ni'$".

The shaped product to be subjected to corona discharge is made of a polyester composition comprising the polyester (A) and optionally at least one of the block copolymerized polyester (B) and the polyester (C) in a weight proportion satisfying the relationships (3) and (4).

The polyester (A) comprises units of at least one of dibasic acids and units of at least one of diols. Not less than 80 mol % of the dibasic acids is required to be terephthalic acid. Examples of the other dibasic acids which may be included in an amount of not more than 20 mol % are isophthalic acid, phthalic acid, adipic acid, sebasic acid, succinic acid, oxalic acid, etc. A part of the dibasic acids may be replaced by an oxy acid such as p-hydroxybenzoic acid. As the diols, there may be used alkylene glycols such as ethylene glycol, propylene glycol, trimethylene glycol, tetramethylene glycol, hexamethylene glycol and cyclohexanedimethanol. Among them, preferred are ethylene glycol, tetramethylene glycol, cyclohexanedimethanol, etc. Typical examples of the polyester (A) are polyethylene terephthalate, polytetramethylene terephthalate, etc.

The block copolymerized polyester (B) comprises units of at least one high melting crystalline polyester segment (hereinafter referred to as "component (D)") and units of at least one low melting soft polymer segment having a molecular weight of 400 to 10,000 (hereinafter referred to as "component (E)"). When a polymer is constituted with units of the high melting crystalline polyester segment alone, its melting point is not lower than 170° C. When a polymer is constituted with units of the low melting soft polymer segment alone, its melting or softening point is not higher than 100° C.

The crystalline polyester segment (D) may be a polyester comprising units of an aromatic dicarboxylic acid (e.g. terephthalic acid, isophthalic acid, 1,5-naphthalenedicarboxylic acid, 2,6-naphthalenedicarboxylic acid) and units of an an aliphatic, aromatic or alicyclic diol (e.g. ethylene glycol, propylene glycol, tetramethylene glycol, pentamethylene glycol, 2,2-dimethyltrimethylene glycol, hexamethylene glycol, p-xylylene glycol, cyclohexanedimethanol), a copolymerized polyester comprising units of an aromatic dicarboxylic acid as exemplified above and units of an aliphatic, aromatic or alicyclic diol as exemplified above, any of them being partially replaced by an oxy acid such as p-(beta-hydroxyethoxy)benzoic acid or p-hydroxybenzoic acid, a polyether ester comprising units of an aromatic ether dicarboxylic acid (e.g. 1,2-bis(4,4-dicarboxymethylphenoxy)ethane, di(4-carboxyphenoxy)ethane) and units of a diol as exemplified above, a polyamide ester comprising units of an aromatic amide dicarboxylic acid (e.g. bis(N-p-carboethoxyphenyl)terephthalimide) and units of a diol as exemplified above, etc. As the soft polymer segment (E), there may be exemplified a polyether (e.g. polyethylene oxide glycol, polypropylene oxide glycol, polytetramethylene oxide glycol, copolymerized glycol of ethylene oxide with propylene oxide, copolymerized glycol of ethylene oxide with tetrahydrofuran), an aliphatic polyester (e.g. polyneopentyl azelate, polyneopenyl adipate, polyneopentyl sebacate), a polylactone (e.g. poly-ε-caprolactone, polypivalolactone), etc. Said block copolymerized polyester (B) may be prepared by a conventional polycondensation procedure.

Specific examples of the block copolymerized polyester (B) are polyethylene terephthalate-polyethylene oxide block copolymer, polytetramethylene terephthalate-polyethylene oxide block copolymer, polycyclohexane terephthalate-polyethylene oxide block copolymer, polycyclohexane terephthalate-polytetramethylene terephthalate block copolymer, polyethylene terephthalate-polytetramethylene oxide block copolymer, polytetramethylene terephthalate-polytetramethylene oxide block copolymer, polytetramethylene terephthalate-polytetramethylene oxide block copolymer, polyethylene terephthalate-polyethylene oxide-polypropylene oxide block copolymer, polyethylene terephthalate-poly-ε-caprolactone block copolymer, polytetramethylene terephthalate-poly-ε-caprolactone block copolymer, polyethylene terephthalate-polypivalolactone block copolymer, polyethylene terephthalate-polyethylene adipate block copolymer, polyethylene terephthalate-polyneopentyl sebacate block copolymer, polytetramethylene terephthalate-polyethylene dodecanate block copolymer, polytetramethylene terephthalate-polyneopenyl dodecanate block copolymer, block copolymer of polyester of di(4-carboxyphenoxy)ethane with ethylene glycol and polyethylene glycol, block copolymer of polyester of bis(N-p-carboethoxyphenyl)adipamide with ethylene glycol and polyethylene glycol, etc.

The amount of the soft polymer segment (E) of the block copolymerized polyester (B) is preferred to be from about 0.3 to 20% by weight based on the total weight of the polyester (A), the block copolymerized polyester (B) and the polyester (C), because various physical properties inherent to the polyester (A) can be favorably improved within said range. For instance, the resistance to production of pinholes at the folded portion of the ultimate shaped product is increased. When, however, the amount is over about 20% by weight, the strength of the ultimate shaped product may be deteriorated.

The polyester (C) comprises units of at least one of dibasic acids and units of at least one of diols, 25 to 85 mol % of said dibasic acids being terephthalic acid. As the dibasic acids, there may be used those as exemplified in connection with the polyester (A). As the diols, there may be used mixtures of alkylene glycols and dialkylene glycols in optional proportions. Examples of the alkylene glycols are ethylene glycol, propylene glycol, trimethylene glycol, etc. Examples of the dialkylene glycols are diethylene glycol, dipropylene glycol, etc. The amount of the polyester (C) is preferred to be from about 5 to 60% by weight based on the total weight of the polyester (A), the block copolymerized polyester (B) and the polyester (C).

As defined above, the weight proportion of the polyester (A), the block copolymerized polyester (B) and the polyester (C) is required to satisfy the relationships (3) and (4). The use of the block copolymerized polyester (B) and the polyester (C) in an combined amount of 60% by weight or more based on the total weight of the polyester (A), the block copolymerized polyester (B) and the polyester (C) results in depression of the molding or shaping property at a high speed. Any particular limitation is not present on the weight proportion of the block copolymerized polyester (B) and the polyester (C). In other words, the quantitative relationships as hereinbefore or hereinafter stated are applicable to the polyester composition of the invention irrespective of the block copolymerized polyester (B) and/or the polyester (C) being included or not.

For incorporating the block copolymerized polyester (B) and/or the polyester (C) as the optional component(s) into the polyester (A) as the essential component to make a polyester composition, the optional component(s) may be added to the polymerization system for preparation of the polyester (A) on completion of the polymerization. In an alternative, chips of the polyester (A) may be admixed with chips of the block copolymerized polyester (B) and/or of the polyester (C) by the aid of a blender. In another alternative, the block copolymerized polyester (B) and/or the polyester (C) may be added to the polyester (A) immediately before molding or shaping.

In addition to the polyester (A) and optionally at least one of the block copolymerized polyester (B) and/or the polyester (C), any other polymeric material may be incorporated into the polyester composition unless such incorporation deteriorates the physical properties of such composition. In general, the amount of the polymeric material does not exceed 20% by weight on the basis of the weight of the polyester composition. Further, the polyester composition may comprise any conventional additives insofar as any unfavorable influence on the application of corona discharge is not produced. Examples of the additives are stabilizers, lubricants, anti-blocking agents, anti-corrosive agents, ultraviolet absorbers, fire retardants, clarifying agents, anti-oxidants, light-preventing agents, anti-static agents, dye-stuffs, pigments, etc.

In order to prepare a shaped product with the polyester composition, there may be adopted any conventional shaping procedure such as injection molding, extrusion molding, stretching, spinning, etc. Examples of the shaped product are films, sheets, filaments, pipes, tapes, fabrics, non-woven fabrics, etc. Among these shaped products, the process of this invention is the most preferably applicable to a film. Such film may be produced by a conventional procedure, for instance, comprising film-forming (e.g. T-die method, inflation method) to make an unstretched film and uniaxial or biaxial stretching of the unstretched film to make a uniaxially or biaxially stretched film.

For carrying out the process of this invention, a surface of the shaped product of the polyester composition under continuous movement is subjected to corona discharge treatment by passing said surface between an electrode for discharge and another electrode opposite thereto while jetting a gaseous material containing oxygen in an amount of not more than 20% by volume onto said surface. More specifically, the shaped product is passed through an apparatus for corona discharge having at least one pair of electrodes opposite to each other.

The gaseous material may consists of a single component or of two or more components. Examples of the gaseous material are nitrogen, hydrogen, argon, carbon dioxide, oxygen, ozone, xenon, krypton, chlorine, ammonia, nitrogen oxides, etc. A modified air, i.e. the gaseous composition modified from the composition of the air itself, is also usable. Preferred is nitrogen or any gaseous composition comprising nitrogen or a modified air having a higher nitrogen content than the air. The jetting rate may be usually not less than 1% of the supply rate of the shaped product to the corona discharge apparatus, although this is not essential.

The conditions for corona discharge may be appropriately controlled so that the oxygen indexes and the nitrogen indexes before and after the application of corona discharge in the shaped product within 100 Å from the surface can satisfy the requirements (1) and (2). The nitrogen index after application of corona discharge is around 15 as the maximum and may be usually up to 12. From the practical viewpoint, the nitrogen index may be about 9 or less, and any higher nitrogen index is not necessary.

Taking a film uniaxially or biaxially stretched as an example of the shaped product and referring to the acocmpanying drawing, the present invention will be hereinafter explained in detail. However, it should be understood that the structure and arrangement of the electrodes for discharge, the shape of the electrode cover, etc. as shown in the accompanying drawing are merely typical embodiments of the invention and are not intended to limit the invention thereto.

In the accompanying drawing.

Figure 1:
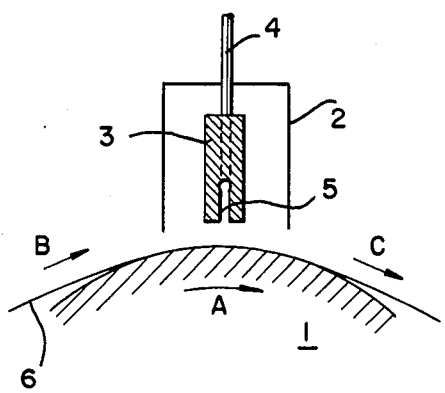
FIG. 1 is a sectional view showing the outline of the process of the invention.
Figure 2:
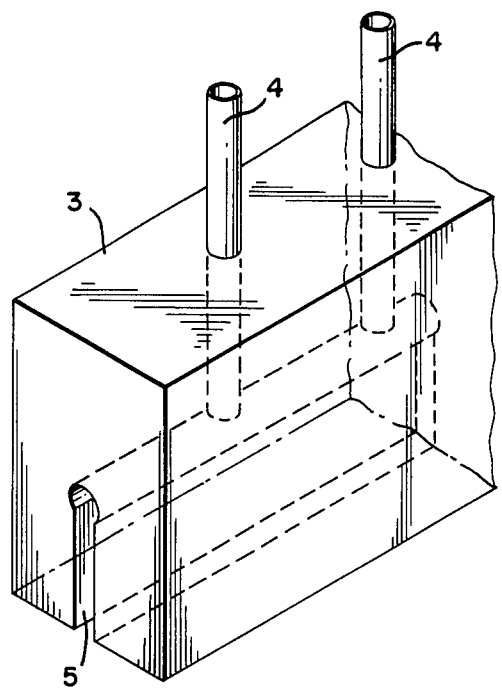
FIG. 2 is a perspective view showing a part of the electrode for discharge usable in the process of the invention.

In these figures, (1) is a metal drum, (2) is an electrode cover, (3) is a discharge electrode, (4) is a gas supply means, (5) is a gas jet nozzle or slit and (6) a running film. The film (6) is introduced along the arrow line B onto the metal drum (1), which rotates in the direction of the arrow line A, and taken out towards the arrow line C. Between the discharge electrode (3) connected to a high voltage generator (not shown) and the metal drum (1) covered by a polymeric material (e.g. a polyester resin, an epoxy resin, a ceramic, a chlorosulfonated polyethylene, an ethylene-propylene rubber or a silicone rubber), a high voltage such as from several thousand to several ten thousand V is applied with a high frequency such as several hundreds KC/S so that a high voltage corona is produced. By the effect of the corona discharge, the film (6) passing through between the metal drum (1) and the discharge electrode (3) is activated at the surface; this is probably due to the formation of such active groups as carbonyl groups, carboxyl groups, imino groups and amino groups at the surface of the film (6).

In the conventional procedure, the air accompanied with or carried on the film (6) oxidizes the surface of the film and deteriorates the adhesion at the surface. In the present embodiment of the invention, the gas jet nozzle or slit (5) is provided on the discharge electrode (3) so as to jet the gaseous material onto the surface of the film (6). Further, the entire atmosphere for corona discharge is shielded from the atmospheric air by the aid of the electrode cover (2). Due to these constructions, the said deterioration is prevented, and the corona discharge effect on the surface of the film (6) can be fully exerted.

Figure 3:
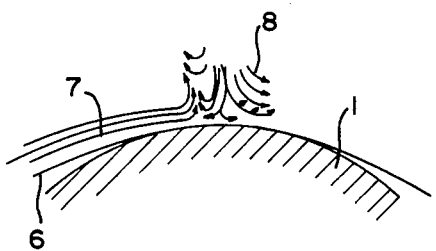
FIG. 3 is a sectional view showing the state of break and elimination of the accompanying air layer at the surface of a film.

The film (6) running along the arrow line B with high speed carries more or less the air on the surface. Such air will be hereinafter referred to as "accompanying air". Because of this reason, the surface of the film (6) remains covered with the air even after the atmosphere in which corona discharge is effected is replaced by the gaseous material. When the gaseous material is strongly jetted onto the surface of the film (6) (FIG. 3), the layer of accompanying air (7) is broken and eliminated by the jet stream (8), and the atmosphere on the surface of the film is almost perfectly replaced by the gaseous material. The rate of the jet stream (8) required for break and elimination of the layer of accompanying air (7) depends upon various factors and is not limitative. Usually, however, it may be decided on the rate of the layer of accompanying air (7), i.e. the running rate of the film (6). Namely, the rate of the jet stream of the gaseous material may be adjusted to not less than 1%, preferably not less than 10%, more preferably not less than 40% of the running rate of the film (6), which may be usually from 1 to 500 m/min, coming into the corona discharge apparatus. By the above operation, the layer of accompanying air is broken and eliminated. Simultaneously, the part to which corona discharge is to be applied and its neighbouring part are protected by the gaseous material.

Figure 4:
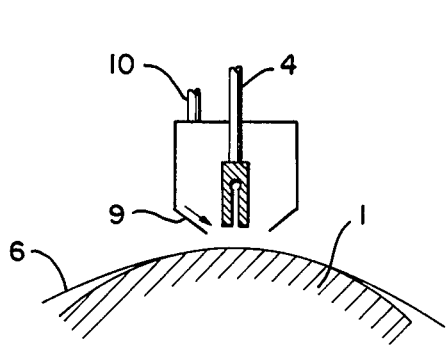
FIG. 4 is a sectional view showing an embodiment of the electrode cover and FIG. 5 is a sectional view showing another embodiment of the electrode cover.
Figure 5:
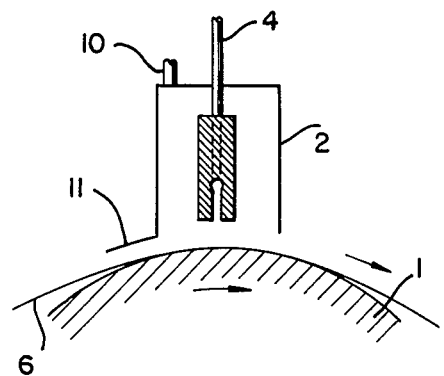

The use of the electrode cover (2) as shown in FIG. 1 is not essential but preferable, because it is effective for protecting the electrode (3) from any mechanical impact, decreasing the accompanying air and retaining the desirable atmosphere. The electrode cover (2) may be shaped in any special structure so as to enhance its atmosphere retaining function. For instance, as shown in FIG. 4, the electrode cover (2) may be narrowed at the lower portion, and simultaneously the gaseous material is introduced from the pipe or slit (10) into the electrode cover (2) so that the gaseous material flows down along the inside wall of the inclined surface to exert a gas curtain effect at the entrance of the electrode cover (2). Further, for instance, the extended cover (11) is provided at the entrance of the electrode cover (2) and positioned closely to the surface of the shaped product as shown in FIG. 5. Since the gaseous material from the electrode cover (2) is retained inside the extended cover (11), the accompanying air coming from the extended cover (11) is broken and diffused little by little. When the film (6) reaches the place at which it is to be treated with corona discharge, the substitution with the inert gas is so high as attaining the desired technical effect. Besides, the use of the extended cover (11) makes it possible to jet the inert gas therefrom. Still, the pipe or slit (10) may be provided at any optional position of the electrode cover (2), for instance, on the upper side of the electrode cover (2) as shown in FIG. 4 or 5, or near the entrance of the electrode cover (2). Further, the pipe or slit (10) may be single or plural.

At the discharge side, the gaseous material in the electrode cover (2) goes out with the running film (6), and such high regard as required at the entrance side is not needed. In order to save the consumption of the gaseous material, however, the same regard at the entrance may be made also at the discharge side. Alternatively, for instance, the electrode cover (2) may be so constructed to have a passage for the gaseous material, which is jetted at the lower or lowest edge of the entrance side towards the surface of the running film, preferably counter-currently. When desired, an additional passage may be provided in the electrode cover (2) itself so as to carry out jetting at the edge of the discharge side. For exertion of the shield effect, the jetting rate of the gaseous material is desired to be kept at not less than 0.2%, preferably not less than 10%, of the running rate of the film. Any material limitation is not present on the upper jetting rate and may be decided on the economy and the quality of the final product.

The effect of corona discharge is much increased when the application is made under the conditions as set forth above, and the adhesive properties with various materials such as metals, printing inks, resins, etc. are much improved.

Practical and presently preferred embodiments of the invention are illustratively shown in the following examples, wherein part(s) and % are by weight, unless otherwise indicated.

In these examples, measurement of the physical properties was made in the following manner:

(1) Haze

Measured by the process as described in JIS (Japanese Industrial Standards) K-6714.

(2) Laminate strength

Original film

A test film (single sheet) was subjected to treatment and/or storage as defined. Thereafter, it was printed with a cellophane ink, a polyethylene imine was coated thereon and, after drying, polyethylene of low density was laminated thereon at 290° C. by the melt extrusion procedure to make a laminated layer of 30 μm in thickness. The film and the laminated layer were separated from each other under the conditions of the peeling angle of 180° and a peeling rate of 200 mm/min. The adhesive strength on separation was measured.

In case of application with boiling water treatment or retort treatment, laminating was carried out using an isocyanate adhesive agent, and evaluation was made after ageing at 40° C. for 2 days.

Laminate film

A test film (single sheet) was printed with a cellophane ink, a polyethylene imine was coated thereon and, after drying, polyethylene of low density was laminated thereon at 290° C. by the melt extrusion procedure to make a laminated layer of 30 μm in thickness. After subjecting to further treatment or storage as defined, the film and the laminated layer were separated from each other under the conditions of a peeling angle of 180° and a peeling rate of 200 mm/min. The adhesive strength on separation was measured.

In case of application with boiling water treatment or retort treatment, laminating was carried out using an isocyanate adhesive agent, and evaluation was made after ageing at 40° C. for 2 days.

EXAMPLES 1-2 AND COMPARATIVE EXAMPLES 1-2

Polyethylene terephthalate (intrinsic viscosity, 0.65 dl/g) was melt extruded at 280° C. to make an unstretched film, which was subsequently stretched at 90° C. in a machine direction with a stretch ratio of 3.2 and at 95° C. in a transverse direction with a stretch ratio of 3.5, followed by heat fixation at 230° C. for 3 seconds to give a biaxially stretched film of 12 μm in thickness.

The test film running at a rate of 20 m/min was subjected to corona discharge while jetting a nitrogen gas containing oxygen as shown in Table 1 onto its surface. The electric power intensity was 4,000 J/m$^2$. For comparison, the test film was also subjected to corona discharge in the air or in the nitrogen gas without jetting.

From the ESCA values determined on the test film before and after the corona discharge treatment, the ΔOi/ΔNi ratio (i.e. the ratio of (Oi'−Oi)/(Ni'−Ni)) was calculated. Also, the haze and the laminate strength were measured on the test film. The results are shown in Tables 1 and 2.

TABLE 1

| | | Example | | Comparative | |
|---|---|---|---|---|---|
| | | 1 | 2 | 1 | 2 |
| Conditions for corona discharge treatment | Atmosphere (O$_2$ % by volume; remaining, N$_2$) | 0.1 | 0.1 | 0.1 | Air |
| | Jetting rate (m/sec) | 2 | 5 | 0 | 0 |
| ESCA value | Ni' | 7.6 | 7.8 | 2.8 | 2.5 |
| | ΔOi/ΔNi | −0.18 | −0.21 | 1.6 | 1.9 |

TABLE 2

|  |  |  |  | Example 1 | Example 2 | Comparative 1 | Comparative 2 |
|---|---|---|---|---|---|---|---|
| Haze |  |  |  | 1.8 | 1.8 | 1.8 | 1.9 |
| Laminate strength | Stored at 23° C. under 65% relative humidity | Original film | Immediately | 240 | 230 | 140 | 15 |
|  |  |  | After 3 months | 220 | 230 | 85 | 5 |
|  |  |  | After 6 months | 210 | 250 | 72 | 4 |
|  |  | Laminate film | Immediately | 240 | 230 | 140 | 15 |
|  |  |  | After 3 months | 236 | 230 | 98 | 5 |
|  |  |  | After 6 months | 228 | 270 | 81 | 5 |
|  | Stored at 40° C. under 80% relative | Original film | Immediately | 239 | 230 | 126 | 10 |
|  |  |  | After 3 months | 220 | 250 | 80 | 5 |
|  |  |  | After 6 months | 203 | 240 | 52 | 3 |
|  |  | Laminate film | Immediately | 239 | 280 | 126 | 10 |
|  |  |  | After 3 months | 235 | 275 | 87 | 5 |
|  |  |  | After 6 months | 210 | 250 | 60 | 5 |
|  | After boiling treatment, stored at 23° C. under 65% humidity | Original film | Immediately | 345 | 370 | 201 | 190 |
|  |  |  | After 3 months | 312 | 347 | 157 | 131 |
|  |  |  | After 6 months | 283 | 302 | 130 | 101 |
|  |  | Laminate film | Immediately | 345 | 370 | 201 | 190 |
|  |  |  | After 3 months | 332 | 351 | 163 | 140 |
|  |  |  | After 6 months | 320 | 331 | 141 | 113 |
|  | After boiling treatment, stored at 40° C. under 80% humidity | Original film | Immediately | 345 | 370 | 201 | 190 |
|  |  |  | After 3 months | 300 | 332 | 151 | 128 |
|  |  |  | After 6 months | 260 | 290 | 128 | 90 |
|  |  | Laminate film | Immediately | 345 | 370 | 201 | 190 |
|  |  |  | After 3 months | 321 | 347 | 150 | 110 |
|  |  |  | After 6 months | 310 | 327 | 120 | 88 |
|  | After retort treatment, stored at 23° C. under 65% humidity | Original film | Immediately | 348 | 381 | 210 | 200 |
|  |  |  | After 3 months | 320 | 368 | 160 | 130 |
|  |  |  | After 6 months | 291 | 360 | 141 | 89 |
|  |  | Laminate film | Immediately | 348 | 381 | 210 | 200 |
|  |  |  | After 3 months | 325 | 349 | 160 | 111 |
|  |  |  | After 6 months | 313 | 335 | 118 | 92 |
|  | After retort treatment, stored at 40° C. under 80% humidity | Original film | Immediately | 348 | 381 | 210 | 200 |
|  |  |  | After 3 months | 320 | 333 | 151 | 107 |
|  |  |  | After 6 months | 300 | 320 | 101 | 89 |
|  |  | Laminate film | Immediately | 348 | 381 | 210 | 200 |
|  |  |  | After 3 months | 320 | 328 | 144 | 106 |
|  |  |  | After 6 months | 300 | 320 | 102 | 90 |

From the above results, it is understood that the film subjected to corona discharge according to the invention has a $\Delta Oi/\Delta Ni$ ratio of not more than 1.5, particularly within the range of minus (−), and its laminate strength is markedly enhanced.

EXAMPLES 3–4 AND COMPARATIVE EXAMPLES 3–4

To a mixture of dimethyl terephthalate (83 parts), 1,4-butane diol (110 parts), poly(tetramethylene oxide) glycol (PTG; molecular weight, 2,000) (215 parts) and an oxidation inhibitor ("Ionox 330"; manufactured by Shell Chemical) (0.6 part), tetra-n-butyl titanate (0.03 part) as a catalyst was added; and the resultant mixture was charged in an autoclave. The mixture was subjected to ester exchange under heating and then subjected to polycondensation. To the thus obtained polytetramethylene terephthalate-polytetramethylene oxide block copolymer (molar ratio of terephthalic acid and PTG=4:1), polyethylene terephthalate (intrinsic viscosity, 0.65 dl/g) was added to make a weight ratio of 6:94. The resultant mixture in a melt state was extruded to make an unstretched film, which was subsequently stretched at 87° C. in a machine direction with a stretch ratio of 3.3 and at 95° C. in a transverse direction with a strength ratio of 3.3, followed by heat fixation at 220° C. for 5 seconds to give a transparent stretched film of 12 μm in thickness.

The test film running at a rate of 20 m/min was subjected to corona discharge while jetting a nitrogen gas containing oxygen as shown in Table 3 onto its surface. Electric power intensity was 4,000 J/m². For comparison, the test film was also subjected to corona discharge in the air or in the nitrogen gas without jetting.

From the ESCA values determined on the test film before and after the corona discharge treatment, the $\Delta Oi/\Delta Ni$ ratio was calculated. Also, the haze and the laminate strength were measured on the test film. The results are shown in Tables 3 and 4.

TABLE 3

|  |  | Example 3 | Example 4 | Comparative 3 | Comparative 4 |
|---|---|---|---|---|---|
| Conditions for corona discharge treatment | Atmosphere ($O_2$ % by volume; remaining, $N_2$) | 0.1 | 0.1 | 0.1 | Air |
|  | Jetting rate (m/sec) | 2 | 5 | 0 | 0 |
| ESCA value | Ni' | 7.1 | 8.1 | 2.7 | 2.3 |
|  | $\Delta Oi/\Delta Ni$ | −0.43 | −0.61 | 1.4 | 1.8 |

TABLE 4

|  |  |  |  | Example 3 | Example 4 | Comparative 3 | Comparative 4 |
|---|---|---|---|---|---|---|---|
| Haze |  |  |  | 2.1 | 2.1 | 2.1 | 2.3 |
| Laminate strength | Stored at 23° C. under 65% relative | Original film | Immediately | 340 | 380 | 180 | 160 |
|  |  |  | After 3 months | 320 | 380 | 152 | 138 |
|  |  |  | After 6 months | 310 | 360 | 121 | 119 |

TABLE 4-continued

|  |  |  | Example | | Comparative | |
|---|---|---|---|---|---|---|
|  |  |  | 3 | 4 | 3 | 4 |
| humidity | Laminate film | Immediately | 340 | 380 | 180 | 160 |
|  |  | After 3 months | 336 | 380 | 162 | 142 |
|  |  | After 6 months | 328 | 370 | 139 | 128 |
| Stored at 40° C. under 80% relative | Original film | Immediately | 339 | 380 | 180 | 160 |
|  |  | After 3 months | 320 | 360 | 147 | 125 |
|  |  | After 6 months | 303 | 340 | 116 | 113 |
|  | Laminate film | Immediately | 339 | 380 | 180 | 160 |
|  |  | After 3 months | 335 | 375 | 160 | 140 |
|  |  | After 6 months | 310 | 350 | 132 | 122 |
| After boiling treatment, stored at 23° C. under 65% humidity | Original film | Immediately | 395 | 420 | 250 | 210 |
|  |  | After 3 months | 362 | 397 | 221 | 183 |
|  |  | After 6 months | 333 | 352 | 189 | 155 |
|  | Laminate film | Immediately | 395 | 420 | 250 | 210 |
|  |  | After 3 months | 382 | 401 | 226 | 192 |
|  |  | After 6 months | 370 | 381 | 193 | 160 |
| After boiling treatment, stored at 40° C. under 80% humidity | Original film | Immediately | 395 | 420 | 250 | 210 |
|  |  | After 3 months | 350 | 382 | 218 | 180 |
|  |  | After 6 months | 310 | 340 | 175 | 138 |
|  | Laminate film | Immediately | 395 | 420 | 250 | 210 |
|  |  | After 3 months | 371 | 397 | 211 | 186 |
|  |  | After 6 months | 360 | 377 | 174 | 143 |
| After retort treatment, stored at 23° C. under 65% humidity | Original film | Immediately | 398 | 431 | 255 | 213 |
|  |  | After 3 months | 370 | 418 | 226 | 191 |
|  |  | After 6 months | 341 | 410 | 185 | 162 |
|  | Laminate film | Immediately | 398 | 431 | 255 | 213 |
|  |  | After 3 months | 375 | 399 | 230 | 201 |
|  |  | After 6 months | 363 | 385 | 198 | 171 |
| After retort treatment, stored at 40° C. under 80% humidity | Original film | Immediately | 398 | 431 | 255 | 213 |
|  |  | After 3 months | 370 | 383 | 210 | 183 |
|  |  | After 6 months | 350 | 370 | 176 | 152 |
|  | Laminate film | Immediately | 398 | 431 | 255 | 213 |
|  |  | After 3 months | 370 | 378 | 215 | 191 |
|  |  | After 6 months | 350 | 370 | 188 | 180 |

From the above results, it is understood that the film subjected to corona discharge according to the invention has a ΔOi/ΔNi ratio of not more than 1.5, particularly within the range of minus (−), and its laminate strength is markedly enhanced.

EXAMPLES 5-6 AND COMPARATIVE EXAMPLES 5-6

According to a conventional procedure, a polyester (A) comprising polyethylene terephthalate (90 parts) and a random copolymer (10 parts) obtained by random copolymerizing ethylene glycol to a mixture of terephthalic acid and isophthalic acid was prepared. Separately, a polyester (C) was prepared by the reaction between an acid component comprising terephthalic acid and ortho-phthalic acid in a molar ratio of 80 and 20 and a glycol component comprising ethylene glycol and diethylene glycol in a molar ratio of 80 and 20. The polyester (A) and the polyester (C) were mixed together in a weight ratio of 80:20. The resulting mixture was melt extruded at 280° C. to make an unstretched film, which was subsequently stretched at 90° C. in a machine direction with a stretch ratio of 3.2 and at 95° C. in a transverse direction with a stretch ratio of 3.5, followed by heat fixation at 230° C. for 3 seconds to give a biaxially stretched film of 12 μm in thickness.

The test film running at a rate of 20 m/min was subjected to corona discharge while jetting a nitrogen gas containing oxygen as shown in Table 5 onto its surface. The electric power intensity was 4,000 J/m². For comparison, the test film was also subjected to corona discharge in the air or in the nitrogen gas without jetting.

From the ESCA values determined on the test film before and after the corona discharge treatment, the ΔOi/ΔNi ratio was calculated. Also, the haze and the laminate strength were measured on the test film. The results are shown in Tables 5 and 6.

TABLE 5

|  |  | Example | | Comparative | |
|---|---|---|---|---|---|
|  |  | 5 | 6 | 5 | 6 |
| Conditions for corona discharge treatment | Atmosphere (O₂ % by volume; remaining, N₂) | 0.1 | 0.1 | 0.1 | Air |
|  | Jetting rate | 2 | 5 | 0 | 0 |
| ESCA value | Ni' | 7.4 | 7.9 | 2.7 | 2.3 |
|  | ΔOi/ΔNi | −0.35 | −0.42 | 1.6 | 1.8 |

TABLE 6

|  |  |  |  |  | Example | | Comparative | |
|---|---|---|---|---|---|---|---|---|
|  |  |  |  |  | 5 | 6 | 5 | 6 |
| Haze |  |  |  |  | 1.7 | 1.7 | 1.7 | 1.7 |
| Laminate strength | Stored at 23° C. under 65% relative humidity | Original film | Immediately | | 390 | 430 | 140 | 15 |
|  |  |  | After 3 months | | 320 | 430 | 85 | 5 |
|  |  |  | After 6 months | | 360 | 410 | 72 | 4 |
|  |  | Laminate film | Immediately | | 390 | 430 | 140 | 15 |
|  |  |  | After 3 months | | 386 | 430 | 98 | 5 |
|  |  |  | After 6 months | | 378 | 420 | 81 | 5 |
|  | Stored at 40° C. under 80% | Original film | Immediately | | 389 | 430 | 126 | 10 |
|  |  |  | After 3 months | | 370 | 410 | 80 | 5 |

TABLE 6-continued

|  |  |  | Example | | Comparative | |
| --- | --- | --- | --- | --- | --- | --- |
|  |  |  | 5 | 6 | 5 | 6 |
| relative |  | After 6 months | 353 | 390 | 52 | 3 |
|  | Laminate | Immediately | 389 | 430 | 126 | 10 |
|  | film | After 3 months | 385 | 425 | 87 | 5 |
|  |  | After 6 months | 360 | 400 | 60 | 5 |
| After boiling | Original | Immediately | 415 | 440 | 201 | 190 |
| treatment, | film | After 3 months | 382 | 417 | 157 | 131 |
| stored at 23° C. |  | After 6 months | 353 | 372 | 130 | 101 |
| under 65% | Laminate | Immediately | 415 | 440 | 201 | 190 |
| humidity | film | After 3 months | 402 | 421 | 163 | 140 |
|  |  | After 6 months | 390 | 401 | 141 | 113 |
| After boiling | Original | Immediately | 415 | 440 | 201 | 190 |
| treatment, | film | After 3 months | 370 | 402 | 151 | 128 |
| stored at 40° C. |  | After 6 months | 330 | 360 | 128 | 90 |
| under 80% | Laminate | Immediately | 415 | 440 | 201 | 190 |
| humidity | film | After 3 months | 391 | 417 | 150 | 110 |
|  |  | After 6 months | 380 | 397 | 120 | 88 |
| After retort | Original | Immediately | 415 | 451 | 210 | 200 |
| treatment, | film | After 3 months | 390 | 438 | 160 | 130 |
| stored at 23° C. |  | After 6 months | 361 | 430 | 141 | 89 |
| under 65% | Laminate | Immediately | 418 | 451 | 210 | 200 |
| humidity | film | After 3 months | 395 | 419 | 160 | 111 |
|  |  | After 6 months | 383 | 405 | 118 | 92 |
| After retort | Original | Immediately | 418 | 451 | 210 | 200 |
| treatment, | film | After 3 months | 390 | 403 | 151 | 107 |
| stored at 40° C. |  | After 6 months | 370 | 390 | 101 | 89 |
| under 80% | Laminate | Immediately | 418 | 451 | 210 | 200 |
| humidity | film | After 3 months | 390 | 398 | 144 | 106 |
|  |  | After 6 months | 370 | 390 | 102 | 90 |

From the above results, it is understood that the film subjected to corona discharge according to the invention has a $\Delta Oi/\Delta Ni$ ratio of not more than 1.5, particularly within the range of minus (−), and its laminate strength is markedly enhanced.

What is claimed is:

1. A process for enhancing the adhesion of the surface of a shaped product made of a polyester composition which comprises supplying a shaped product at a rate from 1 to 500 m/min, and applying corona discharge to said surface under the continuous movement between an electrode for discharge and another electrode opposite thereto while jetting nitrogen or a modified air having a higher nitrogen content than the air onto the part of said surface to which corona discharge is applied at a rate not less than 1% of the supply rate of the shaped product so as to achieve the following relationships among oxygen indexes and nitrogen indexes before and after the application of corona discharge and at an inside layer 100 Å thick from the surface:

$$-3.5 \leq (Oi'-Oi)/(Ni'-Ni) \leq 1.5 \quad (1)$$

$$3 \leq Ni' \quad (2)$$

wherein Oi and Oi' are respectively the oxygen indexes before and after the application of corona discharge, said polyester composition comprising at least one polyester comprising units of at least one dibasic acid, of which not less than 80 mol % is terephthalic acid, and units of at least one diol as the component (A) and optionally at least one block copolymerized polyester comprising units of a high melting point crystalline polyester segment, the polymer constituted with the high melting point crystalline polyester segment alone having a melting point of not lower than 170° C., and units of a low melting point soft polyester segment having a molecular weight of 400 to 10,000, the polymer constituted with the low melting point soft polyester segment alone having a softening or melting point of not higher than 100° C., as the component (b) and/or at least one polyester comprising units of at least one dibasic acid, of which 25 to 85 mol % is terephthalic acid, and units of at least one diol as the component (c) in a weight proportion satisfying the following relationships:

$$(B+C)/(A+B+C) \times 100 \leq 60 \quad (3)$$

$$0 \leq B/(B+C) \leq 100 \quad (4)$$

wherein A, B and C are respectively the weights of the components (A), (B) and (C).

2. The process according to claim 1, wherein the polyester (A) is polyethylene terephthalate.

3. The process according to claim 1, wherein the polyester (A) is polytetramethylene terephthalate.

4. The process according to claim 1, wherein the block copolymerized polyester (B) is polytetramethylene terephthalate-polytetramethylene oxide block copolymer.

5. The process according to claim 1, wherein the block copolymerized polyester (B) is polyethylene terephthalate-polytetramethylene oxide block copolymer.

6. The process according to claim 1, wherein the block copolymerized polyester (B) is polyethylene terephthalate-polyethylene oxide block copolymer.

7. The process according to claim 1, wherein the polyester (C) is polyethylene-diethylene terephthalate isophthalate.

8. The process according to claim 1, wherein the polyester composition comprises the polyester (A) and does not comprise the block copolymerized polyester (B) and the polyester (C).

9. The process according to claim 1, wherein the polyester composition comprises the polyester (A) and the block copolymerized polyester (B).

10. The process according to claim 9, wherein the amount of the low melting soft polymer segment of the block copolymerized polyester (B) is from 0.3 to 20% by weight based on the total weight of the polyester (A) and the block copolymerized polyester (B).

11. The process according to claim 1, wherein the polyester composition comprises the polyester (A) and the polyester (C).

12. The process according to claim 11, wherein the polyester (C) is from 5 to 60% by weight based on the total weight of the polyester (A) and the polyester (C).

13. The process according to claim 1, wherein the polyester composition comprises the polyester (A), the block copolymerized polyester (B) and the polyester (C).

14. The process according to claim 1, wherein the nitrogen index after application of corona discharge is not more than 15.

* * * * *